(12) United States Patent
Park

(10) Patent No.: US 10,409,331 B2
(45) Date of Patent: ***Sep. 10, 2019

(54) COVER GLASS FOR ELECTRONIC DEVICE

(71) Applicants:SAMWON ST, Cheongju-si (KR);
ELK CORPORATION, Daejeon (KR)

(72) Inventor: Chul Park, Gyeonggi-do (KR)

(73) Assignee: ELK CORPORATION, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/125,486

(22) PCT Filed: Mar. 12, 2015

(86) PCT No.: PCT/KR2015/002423
§ 371 (c)(1),
(2) Date: Sep. 12, 2016

(87) PCT Pub. No.: WO2015/137754
PCT Pub. Date: Sep. 17, 2015

(65) Prior Publication Data
US 2017/0097661 A1    Apr. 6, 2017

(30) Foreign Application Priority Data

Mar. 12, 2014  (KR) .................. 10-2014-0028750
Apr. 1, 2014   (KR) .................. 10-2014-0038445
(Continued)

(51) Int. Cl.
*G06F 1/16*  (2006.01)
*H04R 17/00* (2006.01)
(Continued)

(52) U.S. Cl.
CPC .......... *G06F 1/1643* (2013.01); *G06F 1/1626* (2013.01); *G06F 1/1637* (2013.01);
(Continued)

(58) Field of Classification Search
CPC ................................ G06F 1/163; G06F 3/044
See application file for complete search history.

(56) References Cited

U.S. PATENT DOCUMENTS 8,587,558 B2    11/2013  Yin et al.
2004/0027680 A1*  2/2004  Ozawa .................. G02B 3/0012
                                                              359/642
(Continued)

FOREIGN PATENT DOCUMENTS

KR    10-2009-0110770    10/2009
KR    10-2011-0095684     8/2011
(Continued)

OTHER PUBLICATIONS

International Search Report for PCT Application No. PCT/KR2015/002423 dated Jun. 16, 2015.

*Primary Examiner* — Nan-Ying Yang
(74) *Attorney, Agent, or Firm* — Kunzler Bean & Adamson

(57) ABSTRACT

Disclosed is a cover glass capable of preventing malfunction of an electrostatic touch screen and expressing a design characteristic of unique texture. The cover glass used for an electrostatic touch screen in an electronic device includes: a glass substrate provided with finely curved parts; and a window decoration made of a metallic material and provided on one surface of the glass substrate so as to correspond to the finely curved parts, wherein the window decoration comprises a plurality of metallic thin film figures electrically insulated from each other.

20 Claims, 15 Drawing Sheets

(30) Foreign Application Priority Data

| | | |
|---|---|---|
| May 2, 2014 | (KR) | 10-2014-0053301 |
| Jun. 13, 2014 | (KR) | 10-2014-0071775 |
| Jul. 21, 2014 | (KR) | 10-2014-0091978 |
| Nov. 28, 2014 | (KR) | 10-2014-0167942 |
| Nov. 28, 2014 | (KR) | 10-2014-0167944 |

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 3/0416* (2013.01); *G06F 3/0418* (2013.01); *G06F 2203/04103* (2013.01); *G06F 2203/04107* (2013.01)

(56) References Cited

U.S. PATENT DOCUMENTS

| | | | |
|---|---|---|---|
| 2010/0182275 A1* | 7/2010 | Saitou | G06F 3/044 345/174 |
| 2011/0012841 A1 | 1/2011 | Lin | |
| 2011/0261010 A1* | 10/2011 | Nishitani | G06F 3/044 345/174 |
| 2011/0316803 A1* | 12/2011 | Kim | G06F 3/044 345/173 |
| 2012/0015157 A1* | 1/2012 | Chen | B32B 3/30 428/195.1 |
| 2013/0320322 A1* | 12/2013 | Muto | H01L 51/0021 257/40 |
| 2015/0177790 A1* | 6/2015 | Uto | G06F 1/1605 381/190 |
| 2015/0220184 A1* | 8/2015 | Park | G06F 3/044 345/174 |

FOREIGN PATENT DOCUMENTS

| | | | |
|---|---|---|---|
| KR | 10-2013-0083628 | 7/2013 | |
| WO | WO-2012093530 A1 * | 7/2012 | ......... H01L 51/0021 |

* cited by examiner

COVER GLASS FOR ELECTRONIC DEVICE

TECHNICAL FIELD

The present invention relates to a cover glass for an electronic 5 device, and more particularly, to a cover glass for an electronic device having a window decoration made of a metallic material capable of preventing malfunction of a touch screen. The present invention was supported by the Ministry of Trade, Industry and Energy (MOTIE) of Republic of Korea and the Korean Evaluation Institute of Industrial Technology (KEIT) through the Materials and Components Technology Development Program (Grant No. 10062220) in the project name of "Development of Strechable Transparent Electrode Film with 3 µm Line Space Based on Cu/Ag Composite Nanoparticles".

BACKGROUND ART

Generally, in devices installed with a touch screen in electronic devices, for example, a smart phone, a tablet, a laptop, a monitor, and the like having a touch screen, a cover glass is attached to the front surface of the touch screen.

Further, a window decoration may be formed at the edge of the cover glass. The window decoration may be provided as a use of covering non-transparent components disposed therebelow, for example, a wire member (not illustrated) and a circuit board (not illustrated) which are disposed at the edge of a touch panel sensor, and formed by a general printing process and the like.

Meanwhile, recently, the performance of the electronic device is important, but an external design of the electronic device us equally important. For example, according to a survey focused on purchasers, it is shown that the first thing considered when purchasing products is just a 'design'. It is a result that the external design of the product has a large effect on the purchase of the product as much as that.

The window decoration plays a basic role of covering the non-transparent components disposed therebelow and may express the external design of the electronic device. To this end, recently, various studies for window decoration materials capable of having unique design effects have been conducted so as to satisfy the rapidly changing needs of consumers.

As an example, recently, various attempts for forming the window decoration by color printing or with novel materials such as oxide multicoating have been conducted.

Meanwhile, when a metallic material is used as the material of the window decoration, a unique design characteristic of metallic texture may be expressed by using the window decoration. However, when the window decoration is formed of a metallic material, there is a problem in that malfunction of the touch screen is caused by a unique electric characteristic of the metal.

Particularly, in the case where the window decoration made of a metallic material is used, when a touch operation is performed at the edge of an electrostatic touch screen adjacent to the window decoration, there are problems in that it is difficult to accurately sense the touch operation of the electrostatic touch screen by an electric effect of the window decoration and undesired malfunction is caused.

Further, since a plurality of wire members transferring a touch signal of the electrostatic touch screen is disposed below the metallic window decoration, even in the case where the touch operation is performed at the center other than the edge of the electrostatic touch screen, there are problems in that interference occurs by the electric characteristic of the window decoration or malfunction occurs by transferring the signal to another undesired wire member, when the signal by the touch operation is transferred according to a specific wire member.

Accordingly, recently, various studies for the window decoration capable of preventing malfunction of the touch screen and expressing the unique design characteristic have been conducted, but are not yet sufficient and thus the development thereof has been required.

DISCLOSURE

Technical Problem

The present invention is directed to provide a cover glass for an electronic device capable of preventing malfunction of a touch screen and expressing a design characteristic of unique texture.

Particularly, the present invention is also directed to provide a cover glass for an electronic device having a window decoration capable of expressing a design characteristic of metallic texture by using a metallic material and preventing malfunction of an electrostatic touch screen.

Further, the present invention is also directed to provide a cover glass for an electronic device capable of preventing reflection of light caused by the metallic window decoration and preventing the damage to a glass substrate by forming a finely curved part and a flat part on the glass substrate.

Further, the present invention is also directed to provide a cover glass for an electronic device capable of preventing malfunction of an electrostatic touch screen by preventing charges from being accumulated in the metallic window decoration.

Further, the present invention is also directed to provide a cover glass for an electronic device capable of improving a window decoration effect by forming the window decoration in a multilayered metal structure.

Further, the present invention is also directed to provide a cover glass for an electronic device capable of improving a product value, contributing to the advanced product, and enhancing the satisfaction of the consumers.

Technical Solution

One aspect of the present invention provides a cover glass for an electronic device in the cover glass used for an electrostatic touch screen in the electronic device having the electrostatic touch screen, the cover glass comprising: a glass substrate provided with finely curved parts; and a window decoration made of a metallic material and provided on one surface of the glass substrate so as to correspond to the finely curved parts, in which the window decoration includes a plurality of metallic thin film figures electrically insulated from each other.

For reference, in the present invention, the cover glass may be understood as a meaning including both a glass disposed on the outermost front surface of the touch screen to be directly exposed to the outside and a glass configuring an LCD panel in an in-cell or on-cell type touch screen. Further, the cover glass of the present invention may be attached on the front surface or the bottom of a case of the electronic device or integrated with the case by a double injection method when injection-molding the case, and may be used as a protective film having an adhesive.

The window decoration is formed by a plurality of metallic thin film figures which is electrically insulated from each other. For reference, the metallic thin film figures may be understood as a meaning including at least one shape of polygons, circles, ovals, and hairlines.

The sizes of the metallic thin film figures may be appropriately changed depending on requirements and design specifications. Preferably, the metallic thin film figures may be provided with sizes capable of minimizing interference in an operation of the touch screen.

As an example, the plurality of metallic thin film figures may be formed to have any one of a width, a horizontal length, a diameter, a long axis, or a short axis which is relatively smaller than a pitch distance as a distance where the signal lines of the touch screen are spaced apart from each other, and the signal lines of the touch screen may be disposed on different metallic thin film figure areas which are electrically insulated from each other in the pitch distance direction, respectively. More particularly, the plurality of metallic thin film figures may be formed to have any one of a width, a horizontal length, a diameter, a long axis, or a short axis within ½ of the pitch distance. The plurality of metallic thin film figures may be formed to have sizes of 0.1 μm to 0.5 mm. In such a structure, different signal lines may be disposed in the metallic thin film figures which are electrically insulated from each other along the pitch distances to prevent interference caused by the metallic thin film figures made of the metal.

For reference, in the present invention, the case where the finely curved parts corresponding to the window decoration are formed on the glass substrate may be understood the case where the window decoration and the finely curved parts are disposed in an overlapped area in planar projection.

The finely curved parts may be formed on one surface or the other surface of the glass substrate according to requirements and design specifications. As an example, the finely curved parts may be formed on the lower surface (one surface) of the glass substrate and the window decoration may be formed on one surface of the glass substrate to cover the finely curved parts. In some cases, the window decoration may be formed on the lower surface of the glass substrate and the finely curved parts may be formed on the upper surface of the glass substrate. Unlike this, the finely curved parts may be provided on one surface of the glass substrate to cover the window decoration.

Further, a non-processed flat part may be provided between the outermost edge and the glass substrate and the finely curved parts. Herein, the flat part may be understood as a flat portion where the finely curved parts are not formed (processed). Due to the characteristic of the glass, when the finely curved parts may be formed up to the outermost edge of the glass substrate, glass is damaged at the outermost edge of the glass substrate and cracks may occur. To this end, in the present invention, the non-processed flat part is provided at the relatively weak edge (the outermost edge) of the glass substrate to prevent the damage and the cracks of the glass substrate.

Further, the cover glass for the electronic device may further include a printing layer formed on the lower surface of the window decoration. The printing layer may express a new design effect through a texture difference from the metallic thin film figures in addition to a light leakage prevention effect.

Furthermore, the printing layer may be made of an electric conductive material to prevent static electricity from being accumulated in the metallic thin film figures, and preferably, the printing layer may be made of a high resistive material of which the specific resistance is larger than 1 Ωcm. Further, the printing layer may be connected to a ground of the electronic device so that the static electricity accumulated in the printing layer is discharged.

Further, the cover glass according to the present invention may further include a metal line formed along the outermost edge of the glass substrate, an oxide thin film layer formed on the glass substrate, an inorganic thin film layer formed to cover the finely curved parts, and a protective coating layer formed to cover the window decoration.

Advantageous Effects

According to the present invention, it is possible to prevent malfunction of a touch screen while expressing a design characteristic of metallic texture by using the window decoration including a plurality of metallic thin film figures.

Particularly, it is possible to prevent malfunction according to interference caused by a metallic characteristic and mistransmission of the signal while expressing an advanced design characteristic of metallic texture by using a plurality of metallic thin film figures which is electrically insulated from each other as the window decoration.

Further, the finely curved parts are formed on the glass substrate to prevent reflection (a reflective mirror effect) of light caused when the window decoration is made of the metal.

Further, the finely curved parts and the window decoration made of the metallic material are formed on different surfaces of the glass substrate and the light incident to the transparent film may be first scattered while passing through the finely curved parts to minimize reflecting of light caused by the window decoration.

Furthermore, it is possible to prevent the damage and cracks on the relatively weak edge part (the outermost edge) of the glass substrate by providing the non-processed flat part between the outermost edge of the glass substrate and the finely curved parts.

Further, since the finely curved parts serving as the scattering layer where the light is scattered and the flat part serving as a mirror surface where the light is reflected coexist on the glass substrate, the light is reflected at the outermost edge of the glass substrate and the light may be scattered at the inner edge thereof, thereby expressing an more advanced and unique design effect.

Further, the high-resistive printing layer is formed to cover the window decoration to prevent malfunction of the touch screen caused by accumulating charges in the window decoration made of the metal. Further, the static electricity accumulated through the printing layer flows out to the ground of the electronic device to prevent malfunction of the touch screen caused by the static electricity.

Further, the window decoration is formed in a multilayered metal structure to more improve the window decoration effect.

Further, it is possible to improve a design characteristic and improve a product value. Therefore, it is possible to contribute to the advanced product and enhance satisfaction of customers.

MODES OF THE INVENTION

Figure 1:
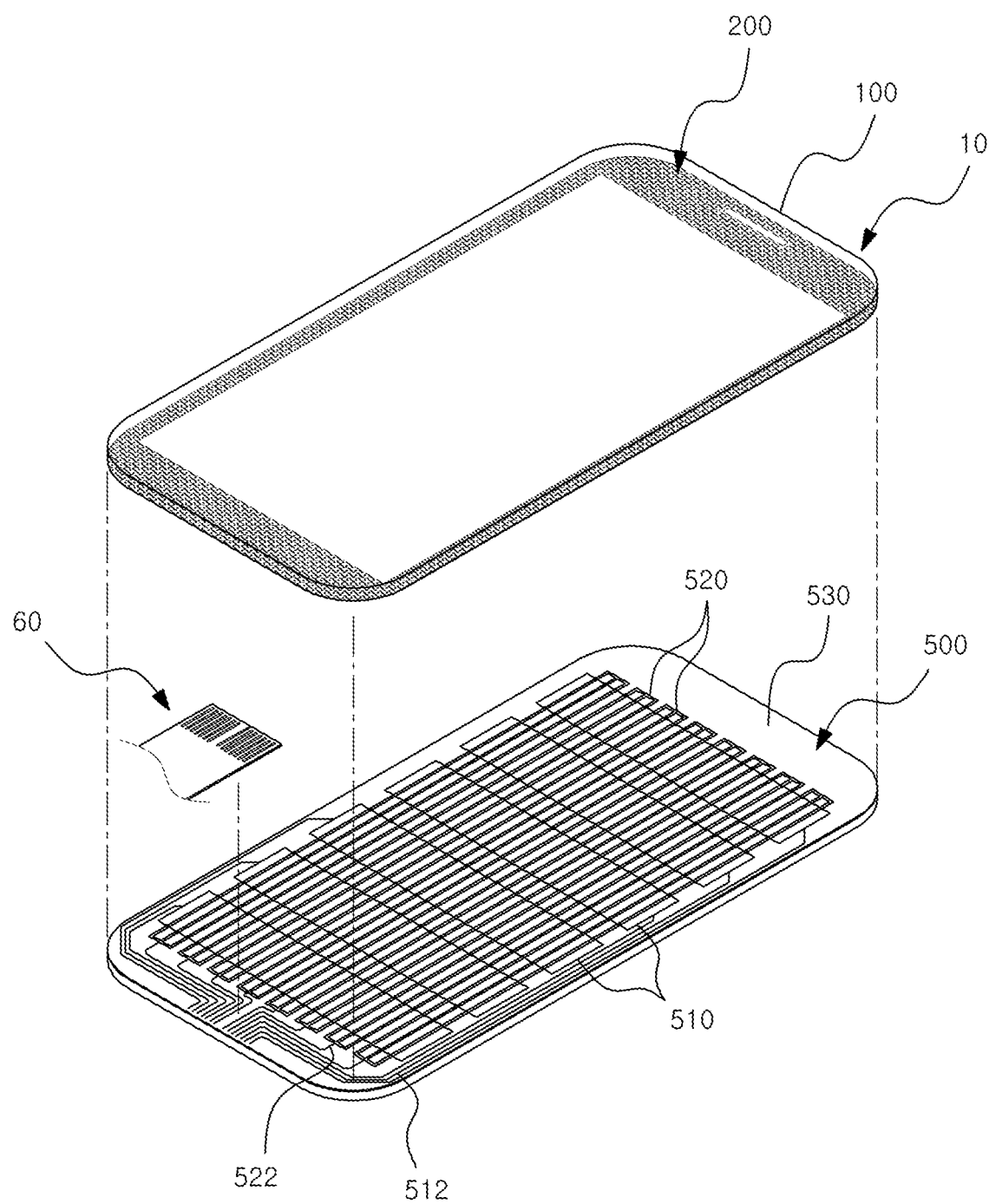
FIG. 1 is a diagram for describing a cover glass for an electronic device according to the present invention.

Hereinafter, exemplary embodiments of the present invention will be described in detail with reference to the accompanying drawings, but the present invention is not limited by the exemplary embodiments. For reference, in the present invention, like reference numerals designate substantially like constituent elements, the contents disclosed in different drawings under the rule can be cited and described, and the contents which are determined to be apparent to those skilled in the art or repeated can be omitted.

Figure 2:
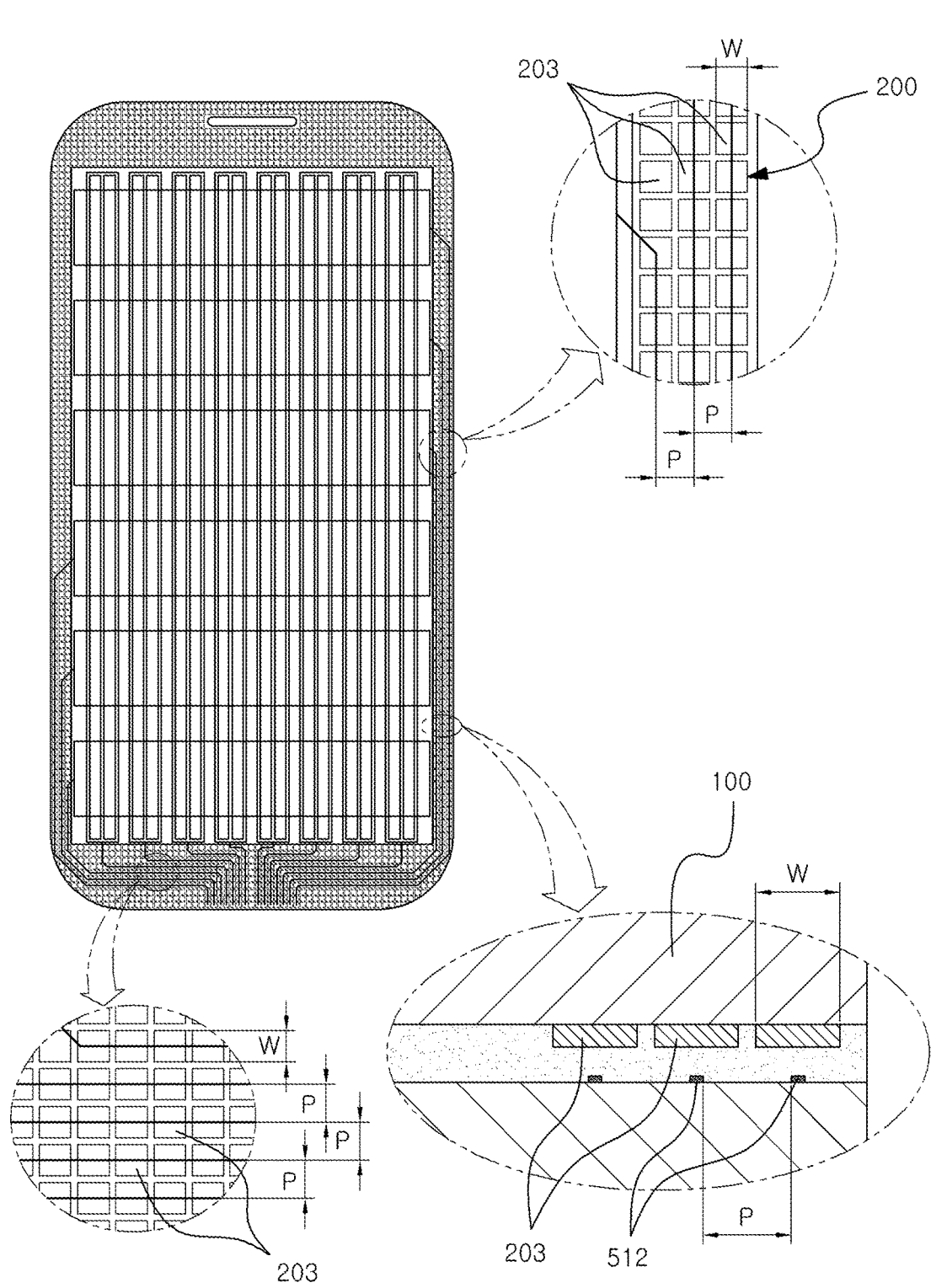
FIG. 2 is a diagram for describing a window decoration as the cover glass for the electronic device according to the present invention.
Figure 3:
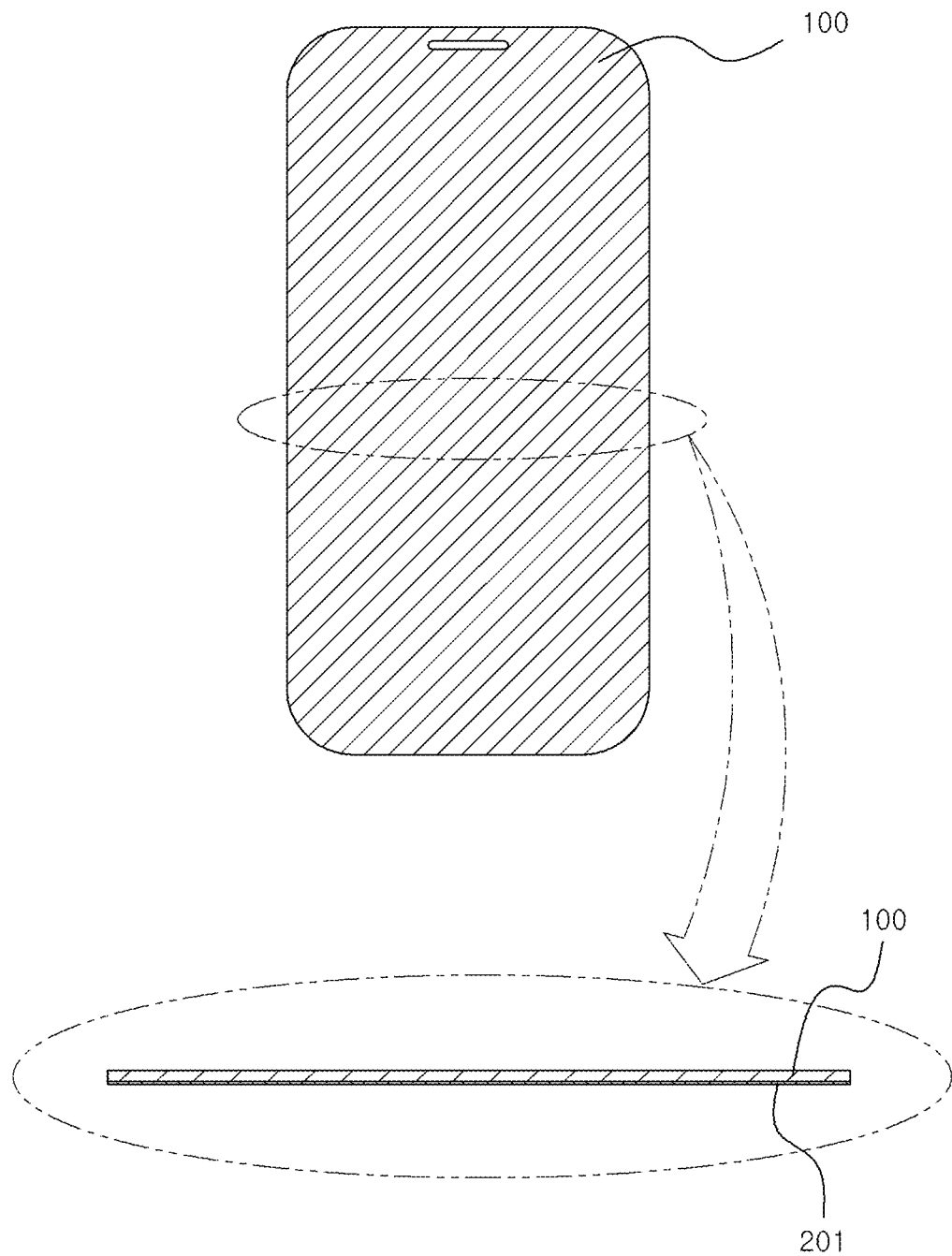
FIGS. 3 to 5 are diagrams for describing a method for manufacturing the cover glass for the electronic device according to the present invention.
Figure 4:
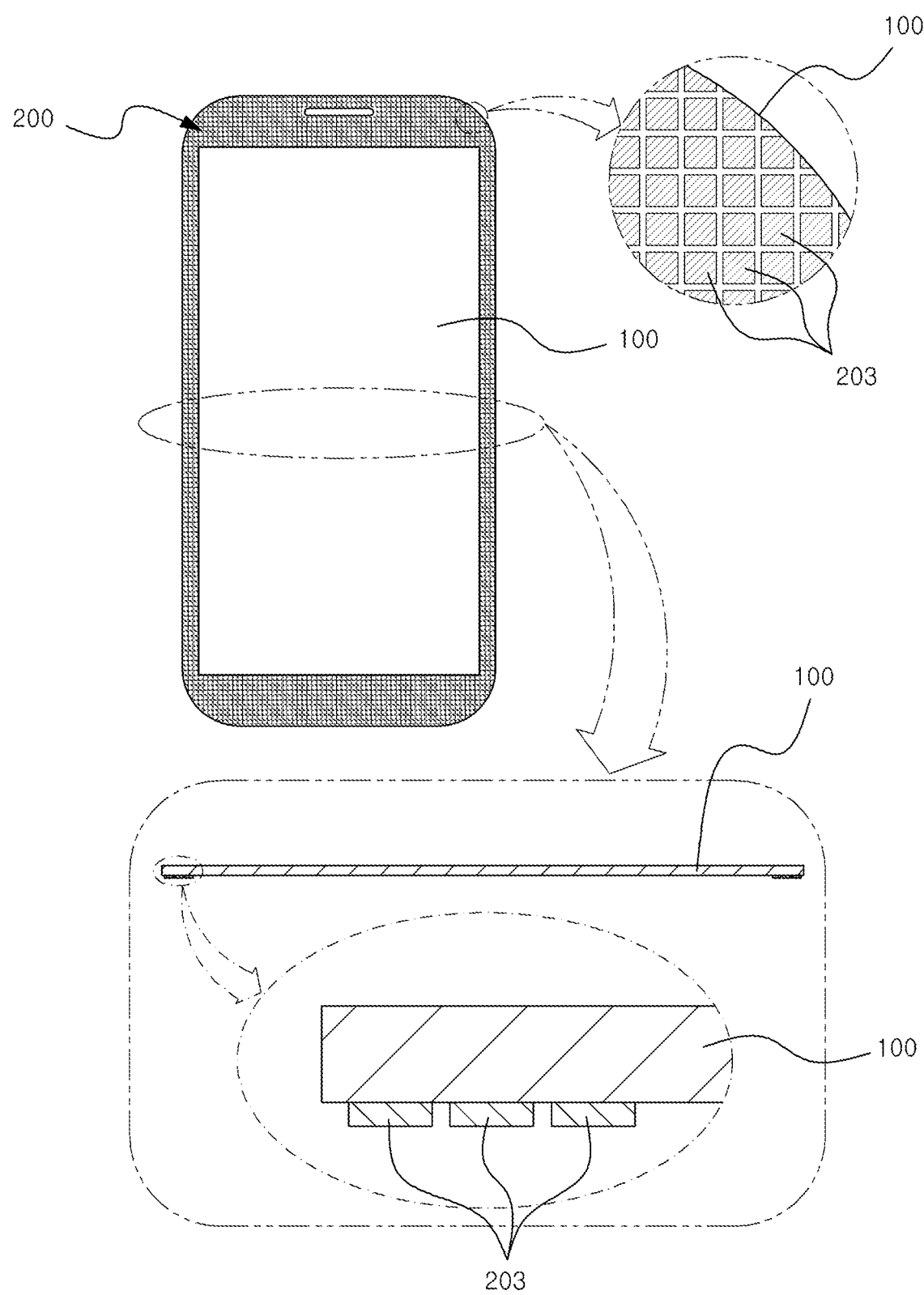
Figure 5:
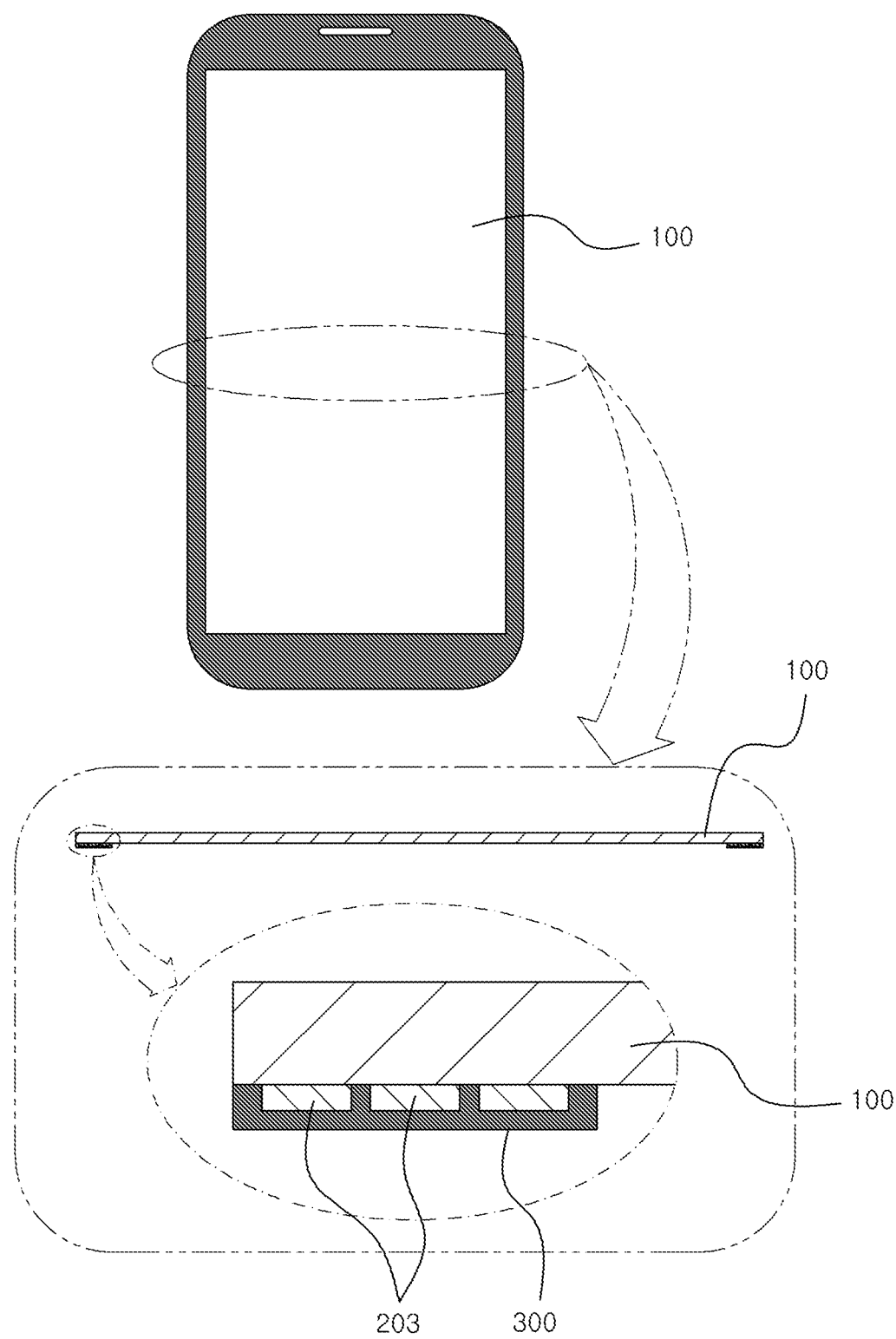

FIG. 1 is a diagram for describing a cover glass for an electronic device according to the present invention and FIG. 2 is a diagram for describing a window decoration as the cover glass for the electronic device according to the present invention. Further, FIGS. 3 to 5 are diagrams for describing a method for manufacturing the cover glass for the electronic device according to the present invention.

Referring to FIGS. 1 and 2, a cover glass 10 for an electronic device according to the present invention includes a glass substrate 100 and a window decoration 200.

For reference, in the present invention, the electronic device may include a smart phone, a tablet, a smart watch, a laptop computer, a monitor, and the like which have an electrostatic touch screen 500, and the present invention is not limited or restricted by a type and a characteristic of electronic device.

The cover glass 10 is installed on the front surface of the touch screen 500, and the window decoration 200 is formed at the edge of the cover glass 10 to be used for covering a wire member (not illustrated) and a circuit board (not illustrated) which are disposed at the edge of the touch screen 500.

For reference, in the present invention, as the touch screen 500, a general electrostatic touch screen 500 capable of static-electrically sensing a touch operation may be used. As an example, the electrostatic touch screen 500 may include a transmitter line 510 and a receiver line 520 which are disposed in a laminated structure and signals of the electrodes 510 and 520 may be transmitted through signal lines (wires) 512 and 522 connected to the respective electrodes. For reference, the transmitter electrode and the receiver electrode may be provided as a structure using a single or a plurality of films or coating layers, and the present invention is not limited or restricted by the laminated structure of each electrode. In other words, the respective electrodes may be formed on a single film (coating layer) or different films (coating layers) in a general laminated structure.

The glass substrate 100 may be formed of general glass, tempered glass, or sapphire. For reference, the glass substrate may be disposed on the front surface of the touch screen to be directly exposed to the outside, but in some cases, other substrates can be laminated on the front surface of the glass substrate.

The window decoration 200 is made of a metallic material and formed on one surface of the glass substrate 100. Herein, one surface of the glass substrate 100 may be understood as a meaning including both the lower surface and the upper surface of the glass substrate 100. Hereinafter, an example in which the window decoration 200 is formed on the lower surface of the glass substrate 100 will be described.

More particularly, the window decoration 200 is formed by a plurality of metallic thin film figures 203 which is electrically insulated from each other. For reference, the metallic thin film figures 203 may be understood as a meaning including at least one shape of a polygon, a circle, an oval, and a hairline.

As such, in the present invention, the window decoration 200 formed by the plurality of metallic thin film figures 203 which is electrically insulated from each other is formed, thereby expressing a design characteristic of metallic texture through the window decoration 200 and preventing malfunction according to interference and mistransmission of the signals caused when the window decoration 200 is made of a metallic material.

Hereinafter, a method for manufacturing the cover glass 10 for the electronic device according to the present invention will be described with reference to FIGS. 3 to 5.

The method for manufacturing the cover glass 10 for the electronic device having the electrostatic touch screen 500 according to the present invention includes providing the glass substrate 100, and forming the window decoration 200 made of a metallic material on one surface of the glass substrate 100. The window decoration 200 is provided by including the plurality of metallic thin film figures 203 which is electrically insulated from each other.

The window decoration 200 including the metallic thin film figures 203 may be formed by various methods according to requirements.

As an example, referring to FIG. 3, first, the glass substrate 100 is provided, a metallic thin film layer 201 is formed on the glass substrate 100, and then the metallic thin film layer 201 is partially removed to form the metallic thin film figure 203.

The metallic thin film layer 201 may be formed on the surface of the glass substrate 100 by a general method including thermal deposition, e-beam deposition, sputtering, and the like. The present invention is not limited or restricted by a kind and a characteristic of the material forming the metallic thin film layer 201. As an example, the metallic thin film layer 201 may be formed in a single-layered or multi-layered structure by using at least one of chromium, aluminum, tin, palladium, molybdenum, and copper. Preferably, the metallic thin film layer 201 may be formed with a thickness of 10 to 500 nm.

In some cases, before the metallic thin film layer is formed, an oxide thin film layer such as alumina ($Al_2O_3$), silicon dioxide ($SiO_2$), and titanium dioxide ($TiO_2$) is coated on the surface of the glass substrate, and then the metallic thin film layer may be formed on the surface of the oxide thin film.

In the exemplary embodiment of the present invention described and illustrated above, an example in which the metallic thin film layer 201 is formed by a single metallic layer is described. However, in some cases, the metallic thin film layer may be provided in a multilayered structure made of different or similar materials, and the metallic thin film figures formed by removing the metallic thin film layer may also be provided in the multilayered metal structure.

Thereafter, after a mask layer (not illustrated) is formed on the surface of the metallic thin film layer 201, the metallic thin film layer 201 is partially etched by using the mask layer to form the plurality of metallic thin film figures 203 which is insulated from each other, as illustrated in FIG. 4. For reference, the plurality of metallic thin film figures 203 may be formed by a general photolithography process. Further, when the metallic thin film figures 203 are formed, a screen area may be etched together.

The plurality of metallic thin film figures 203 may be spaced apart from each other to correspond to the mask layer in the etching process, and the metallic thin film figures 203 may be spaced apart from each other to be electrically insulated from each other. By such a structure, the metallic thin film figures 203 may be electrically insulated from each other, and a radio signal of the touch screen 500 may be prevented from being transferred to other adjacent signals through the metallic thin film figures 203. Furthermore, the mask layer used for etching the metallic thin film figures may be removed before a printing layer is formed, but in some cases, the printing layer may be formed without removing the mask layer.

For reference, in the present invention, an example in which the metallic thin film figures 203 are formed in quadrangular shapes will be described. In some cases, the metallic thin film figures may be formed in other polygonal shapes such as triangles and hexagons or formed in shapes such as circles, ovals, or amorphous shapes. Unlike this, the metallic thin film figures may be formed in hairline shapes.

Meanwhile, the sizes of the metallic thin film figures 203 may be appropriately changed depending on requirements and design specifications. Preferably, the metallic thin film figures 203 may be provided with sizes capable of minimizing interference in the touch panel sensor.

Preferably, referring to FIG. 2, the plurality of metallic thin film figures 203 is formed to have relatively smaller sizes than pitch distances which are separation distances between the signal lines (for example, 512) of the touch screen. The signal lines (for example, 512) of the touch screen may be disposed on different metallic thin film figure areas which are electrically insulated from each other in pitch distance directions, respectively. In other words, different signal lines may be disposed in the metallic thin film figures which are electrically insulated from each other along the pitch distances to prevent interference caused by the metallic thin film figures made of the metal.

Herein, the case where the metallic thin film figure has a relatively smaller size than the pitch distance between the signal lines of the touch screen may be understood as the case where a horizontal length W (alternatively, a width, a diameter, a long axis, and a short axis) of the metallic thin film figure has a relatively smaller size (P>W) than a separation distance between any one signal line and the other signal line which are adjacent to each other. Meanwhile, a vertical length (a length in a perpendicular direction to the pitch distance direction) of the metallic thin film figure may be provided with various sizes regardless of the pitch distance between the signal lines.

Preferably, in order to prevent signal interference of the touch screen 500, the size of the metallic thin film figures 203 may be formed within ½ of a pitch P (a separation distance between wires) of the signal line of the touch screen 500. Generally, the metallic thin film figures 203 having a size within approximately 1 mm may be used, but the size of the metallic thin film figures 203 may be adjusted according to the separation distance (pitch distance) between the signal lines and other conditions. If the pitch of the signal line (wire) of a bezel part of the touch screen 500 is 0.2 mm, the metallic thin film figures 203 may be formed to have a width, a horizontal length, a diameter, a long axis, and a short axis within approximately 0.1 mm. More preferably, the plurality of metallic thin film figures may be formed to have sizes of 0.1 μm to 0.5 mm.

Meanwhile, referring to FIG. 5, the cover glass 10 for the electronic device according to the present invention may include a printing layer 300 formed on the lower surface of the window decoration 200 to cover the window decoration 200. The printing layer 300 may express a new design effect through a texture difference from the metallic thin film figures 203 in addition to a light leakage prevention effect.

The printing layer 300 may be formed through a general silkscreen printing method and the like and provided to have a thickness of approximately 5 to 20 mm.

Further, the printing layer 300 may prevent static electricity from being accumulated in the metallic thin film figures 203. To this end, the printing layer 300 may be formed of an electrically conductive material, and preferably, the printing layer 300 may be made of a high resistive material having a specific resistance which is larger than 1 Ωcm.

For reference, the printing layer 300 may have electric conductivity by adding at least one of carbon powder, metallic powder, and nanoconductive powder to printing ink. In some cases, the printing layer may be configured to have electric conductivity by other methods.

The printing layer 300 may be printed once or many times, and a formation condition of the printing layer 300 may be appropriately changed depending on requirements and design specifications.

Meanwhile, generally, the specific resistance of the metal is $10(-7)$ Ωcm, whereas the printing layer 300 has the specific resistance of 1 Ωcm to have a very high resistance as compared with the metal. Such a printing layer 300 having the high resistance is characterized in that the signal of the touch screen 500 is not interfered while the static electricity is reduced.

Further, the printing layer 300 may be connected to a ground of the electronic device so that the static electricity accumulated in the printing layer 300 is discharged. As an example, the printing layer 300 may be connected to the ground of the electronic device through general FPCB (see 60 of FIG. 1) connection. Such a structure allows the static electricity accumulated through the printing layer 300 to flow out to the ground of the electronic device, thereby preventing malfunction of the touch screen 500 caused by the static electricity.

Figure 6:
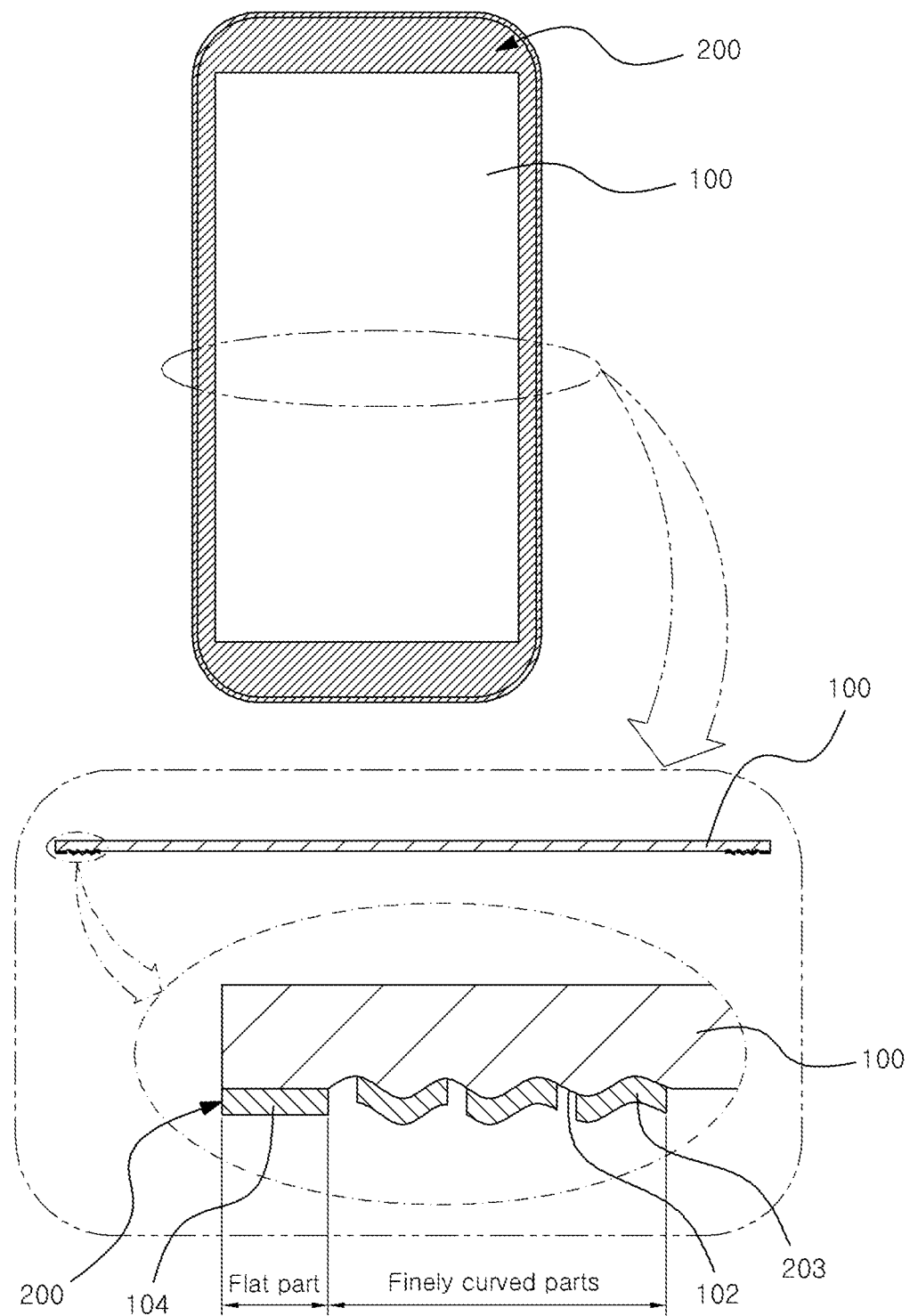
FIG. 6 is a diagram for describing a cover glass for an electronic device according to another exemplary embodiment of the present invention.
Figure 7:
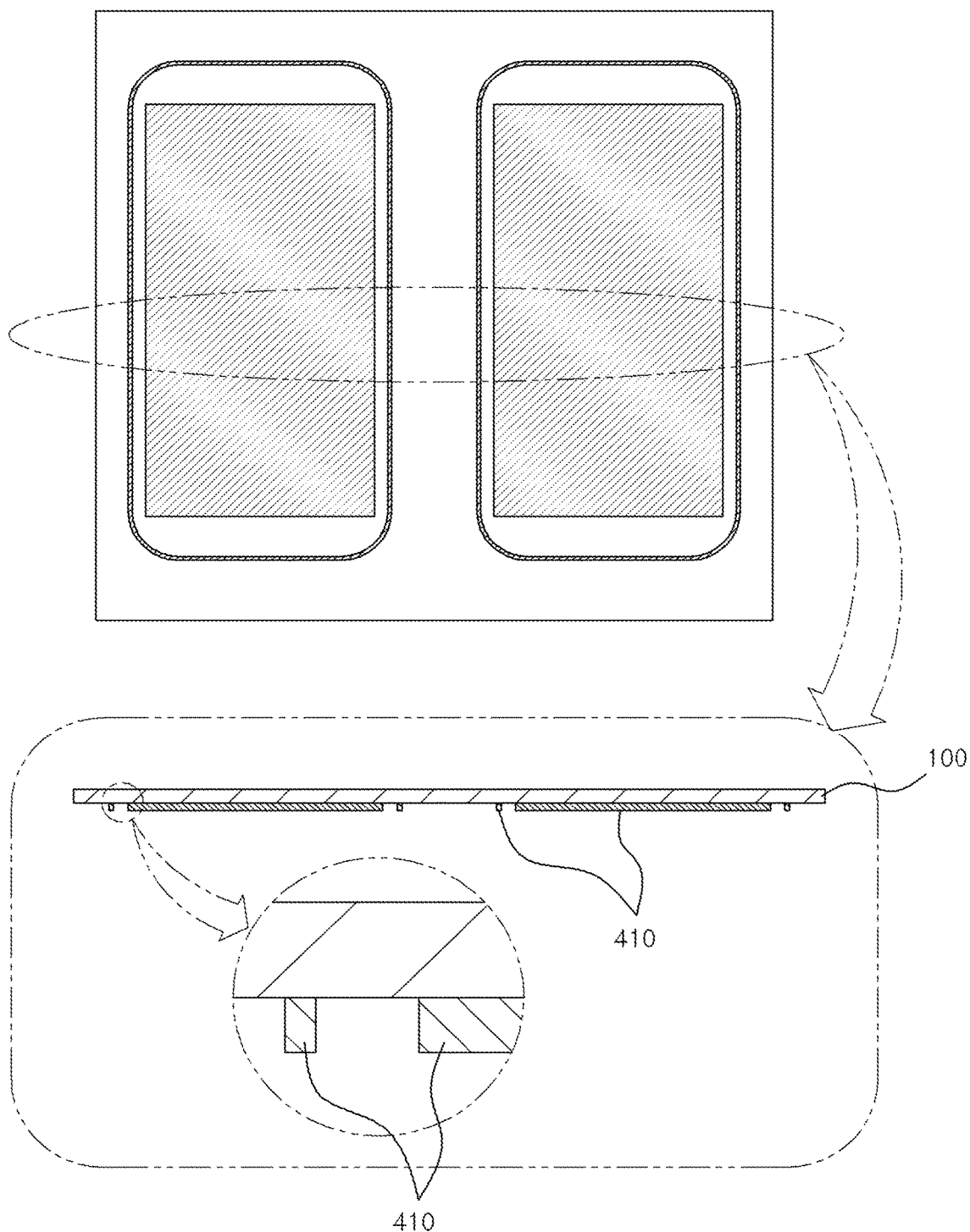
FIGS. 7 to 9 are diagrams for describing a method for manufacturing the cover glass for the electronic device according to another exemplary embodiment of the present invention.
Figure 8:
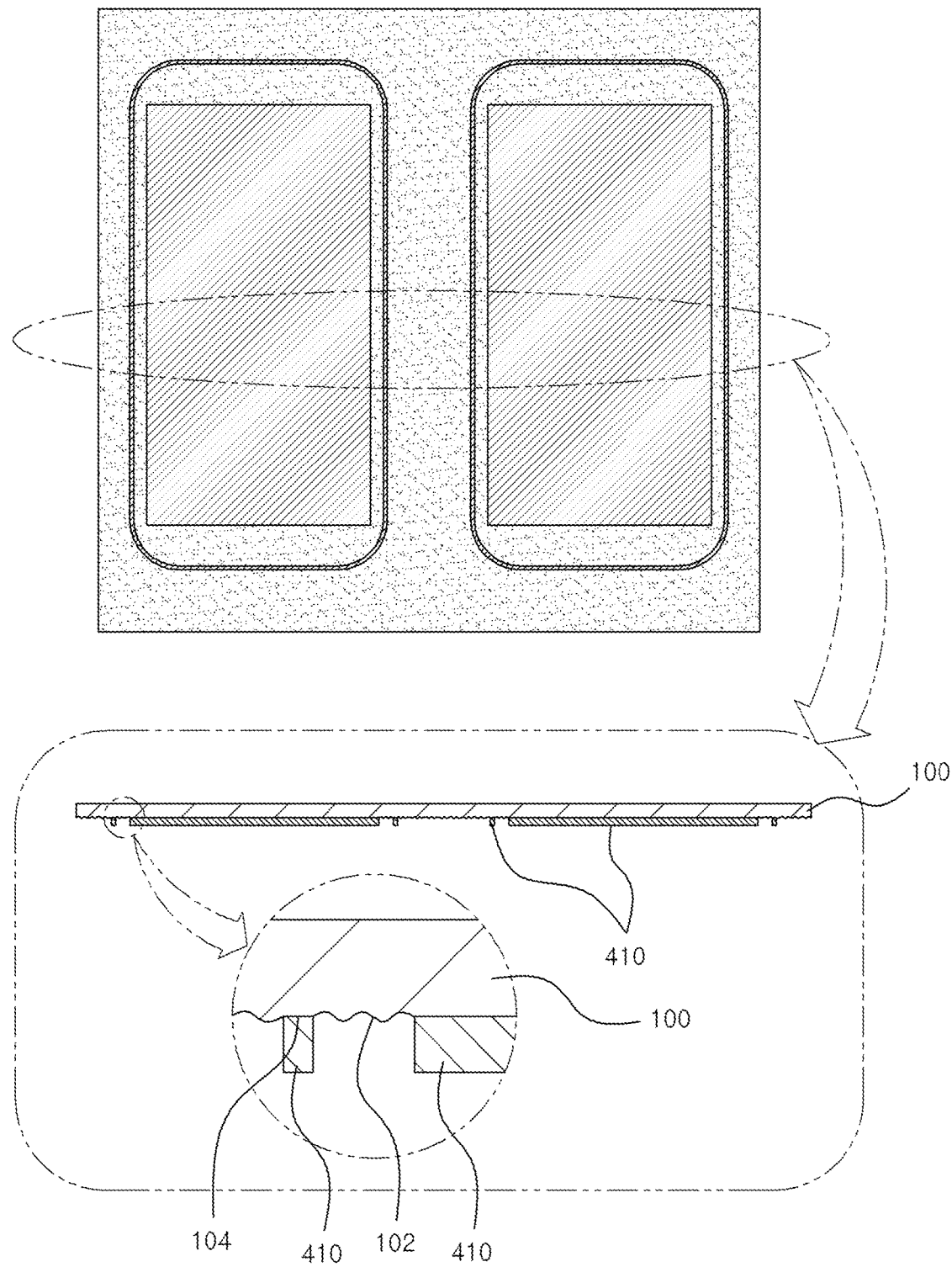
Figure 9:
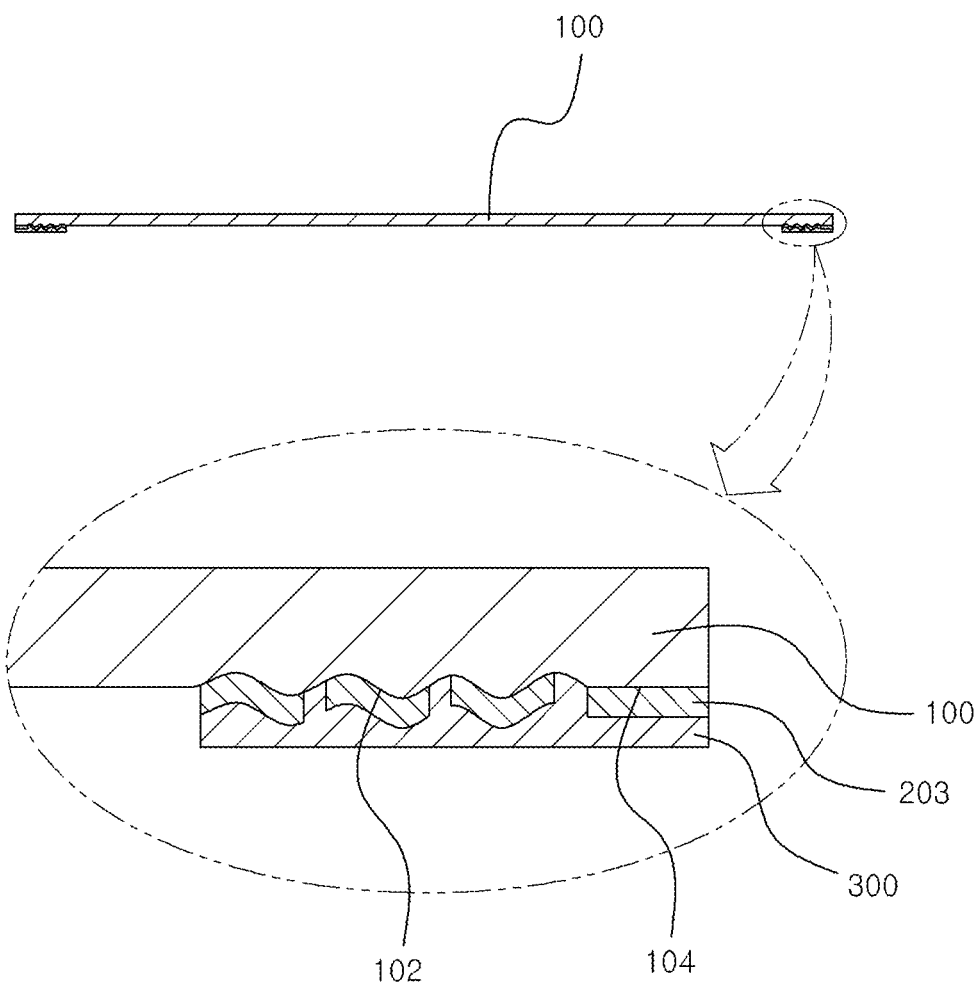
Figure 10:
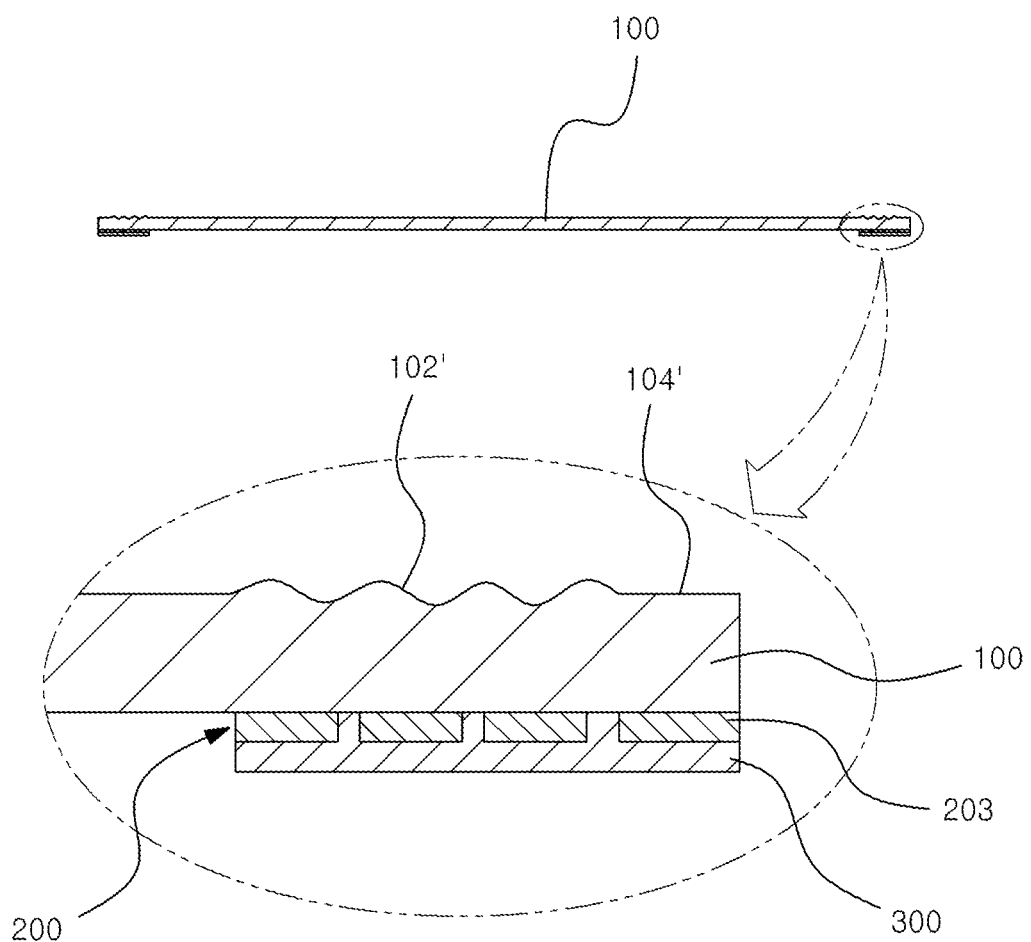
FIG. 10 is a diagram for describing a cover glass for an electronic device according to yet another exemplary embodiment of the present invention.

Meanwhile, FIG. 6 is a diagram for describing a cover glass 10 for an electronic device according to another exemplary embodiment of the present invention, and FIGS. 7 to 9 are diagrams for describing a method for manufacturing the cover glass 10 for the electronic device according to another exemplary embodiment of the present invention. Further, FIG. 10 is a diagram for describing a cover glass 10 for an electronic device according to yet another exemplary embodiment of the present invention. Furthermore, the same and much the same parts as the aforementioned configurations designate the same or much the same reference numerals, and the detailed description thereof will be omitted.

Referring to FIGS. 6 to 9, the cover glass 10 for the electronic device according to another exemplary embodiment of the present invention includes a glass substrate 100 and a window decoration 200, and finely curved parts 102 corresponding to the window decoration 200 may be formed on the glass substrate 100.

The finely curved parts 102 may be formed to prevent reflection (a reflective mirror effect) of light caused when the aforementioned window decoration 200 is made of the metal.

For reference, in the present invention, the case where the finely curved parts 102 corresponding to the window decoration 200 are formed on the glass substrate 100 may be understood as the case where the window decoration 200 and the finely curved parts 102 are disposed in an overlapped area in planar projection.

The finely curved parts 102 may be formed on one surface or the other surface of the glass substrate 100 according to requirements and design specifications. As an example, the finely curved parts 102 may be formed on the lower surface (one surface) of the glass substrate 100, and the window decoration 200 may be formed on one surface of the glass substrate 100 to cover the finely curved parts 102.

The finely curved parts 102 may be formed by processing the surface of the glass substrate 100 by using at least one processing method of sandblasting, etching, plasma-etching, laser processing, and mechanical processing, and the present invention is not limited or restricted by the processing method of the finely curved parts 102. In some cases, without surface processing of the glass substrate, a polymer resin layer having a curve or a scattering layer including micro beads is formed on the surface of the glass substrate, and thus the scattering layer may serve as the finely curved parts. The scattering layer may be provided by mixing and then curing micro beads in a general resin such as an UV curing resin or ink.

Referring to FIG. 7, first, after a masking pattern 410 is formed on the glass substrate 100 through a printing or photomasking process, as illustrated in FIG. 8, the finely curved parts 102 having random shapes and sizes of 1 to 10 mm may be formed by sandblasting a part without the masking pattern 410. On the other hand, in the case of forming the finely curved parts 102 by laser processing and the like, the finely curved parts 102 may be formed to have regular distances and sizes.

Furthermore, the part with the finely curved parts 102 may have a hazy effect that looks cloudy in addition to a scattering effect in which the light is scattered.

For reference, the glass substrate 100 may be provided to correspond to at least one touch screen 500 and tailored and provided by forming the finely curved parts 102 and then removing the making pattern 410. Furthermore, when the glass substrate 100 is reinforced glass, the glass substrate 100 may be reinforced after the finely curved parts 102 are formed on the glass substrate 100.

Further, a non-processed flat part 104 may be provided between the outermost edge of the glass substrate 100 and the finely curved parts 102. Herein, the flat part 104 may be understood as a flat portion in which the finely curved parts 102 are not formed (not processed).

When the aforementioned finely curved parts 102 may be formed up to the outermost edge of the glass substrate 100, due to the characteristic of the glass, glass is damaged at the outermost edge of the glass substrate 100 and cracks may occur. Particularly, the reinforced glass has high strength, but is easily damaged when the cracks occur at the edge.

To this end, in the present invention, the non-processed flat part 104 is provided at the relatively weak edge (the outermost edge) of the glass substrate to prevent the damage and the cracks of the glass substrate 100. Preferably, while the damage to the glass substrate 100 is prevented, the flat part 104 may be provided to have a width within approximately 1 mm so as to minimize the reflection of light through the flat part 104.

The flat part 104 may be provided by forming the masking pattern 410 at the portion corresponding to the flat part 104 and removing the masking pattern 410 after forming the finely curved parts 102, when forming the masking pattern 410 for forming the finely curved parts 102.

As such, according to the present invention, the finely curved parts 102 and the flat part 104 are provided on the glass substrate 100 to prevent the reflection of light caused by the window decoration 200 made of the metal and simultaneously, prevent the damage to the glass substrate 100.

Referring back to FIG. 6, after the finely curved parts 102 are formed, the window decoration 200 may be formed to cover the finely curved parts 102 and the flat part 104 together.

Further, referring to FIG. 9, after the window decoration 200 is formed to cover the finely curved parts 102 and the flat part 104 of the glass substrate 100, the printing layer 300 may be formed to cover the window decoration 200.

Meanwhile, in the exemplary embodiment of the present invention described above, an example in which the finely curved parts and the window decoration are formed on the same surface (lower surface) of the glass substrate is described, but in some cases, the finely curved parts and the window decoration may be configured to be formed on opposite surfaces of the glass substrate.

That is, referring to FIG. 10, the window decoration 200 may be formed on the lower surface of the glass substrate 100, and finely curved parts 102' and a flat part 104' may be formed on the upper surface of the glass substrate 100 corresponding to the window decoration 200. Similarly, the printing layer 300 may be formed below the window decoration 200 to cover the window decoration 200. In such a structure, light incident to the glass substrate 100 may be first scattered by passing through the finely curved parts 102' to minimize the reflection of light caused by the window decoration 200.

In some cases, the window decoration and the finely curved parts are formed on the same surface (for example, the lower surface) of the glass substrate, but after the window decoration is first formed on the lower surface of the glass substrate, the finely curved parts may be formed to cover the lower surface of the window decoration. In this case, the aforementioned scattering layer may be used as the finely curved parts.

Further, in the exemplary embodiment of the present invention described and illustrated above, an example in which the window decoration 200 is directly formed on the surface of the glass substrate 100 is described. However, in some cases, after the window decoration is formed on a separate film member (for example, an anti-scattering film or a decoration film), the film member may be attached to the glass substrate. Further, unlike this, a coating layer made of a metallic material or other materials may be formed to cover the window decoration.

Figure 11:
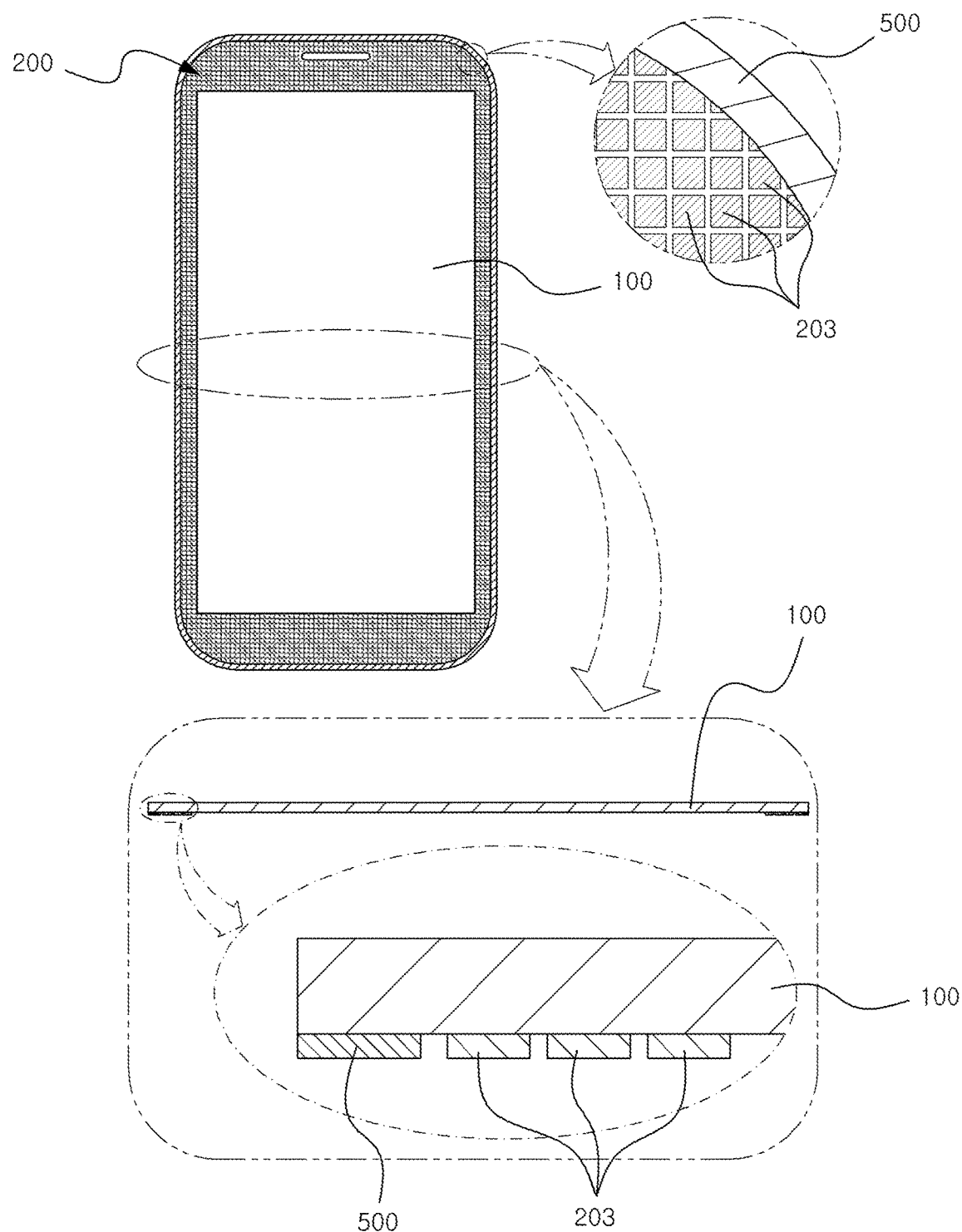
FIG. 11 is a diagram for describing a metal line as the cover glass for the electronic device according to the present invention.
Figure 12:
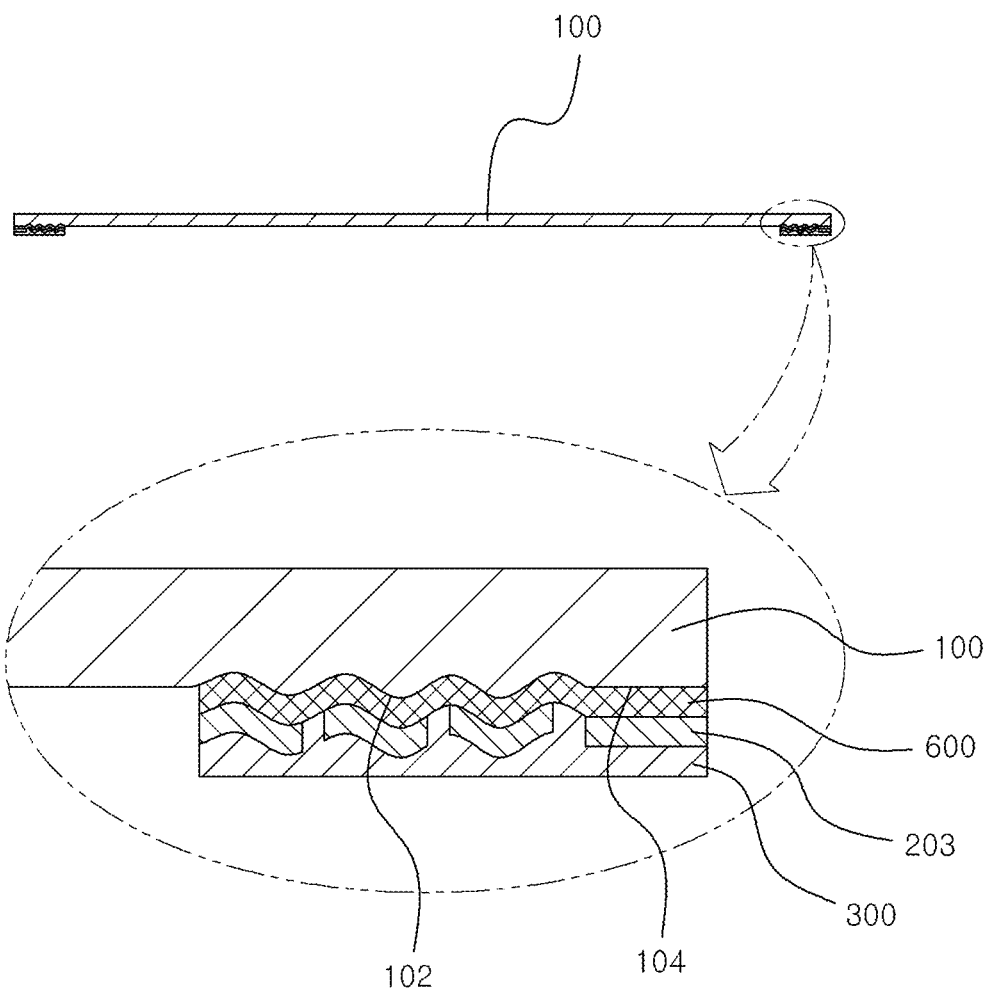
FIG. 12 is a diagram for describing an oxide thin film layer as the cover glass for the electronic device according to the present invention.
Figure 13:
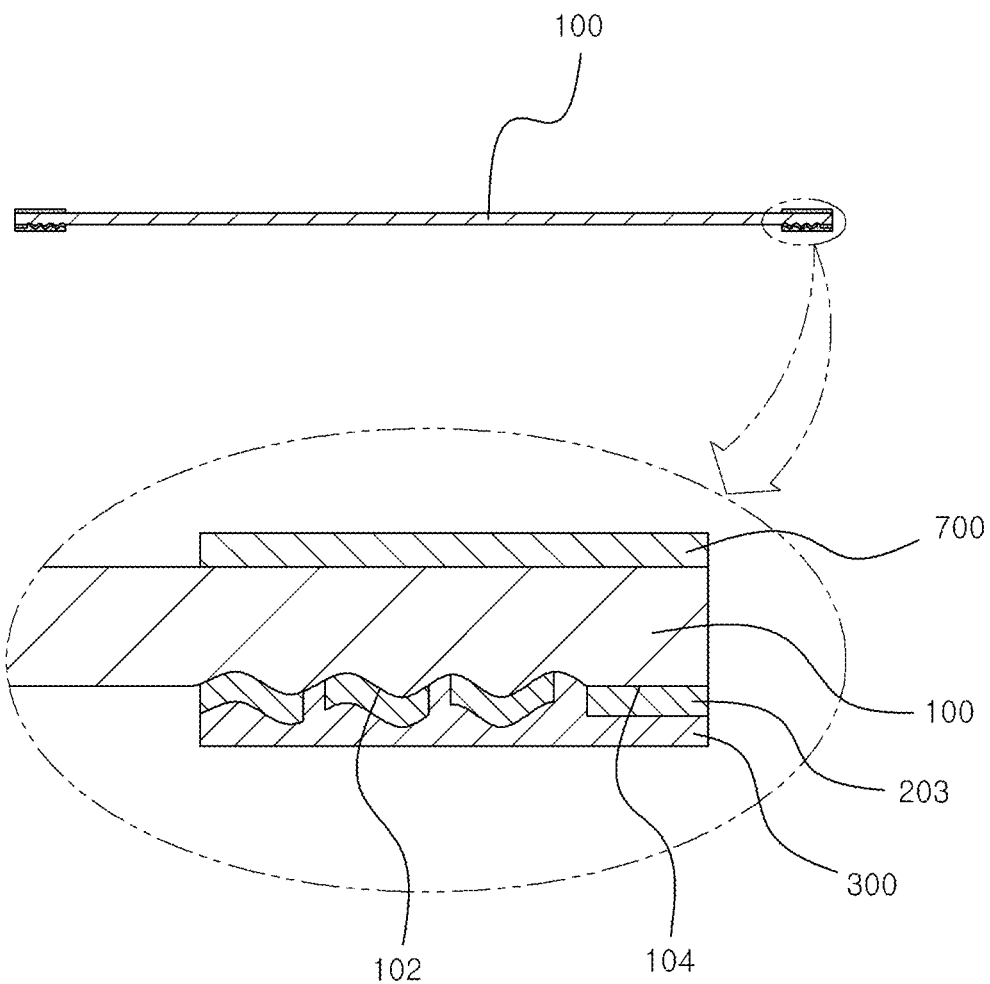
FIG. 13 is a diagram for describing an inorganic thin film layer as the cover glass for the electronic device according to the present invention.
Figure 14:
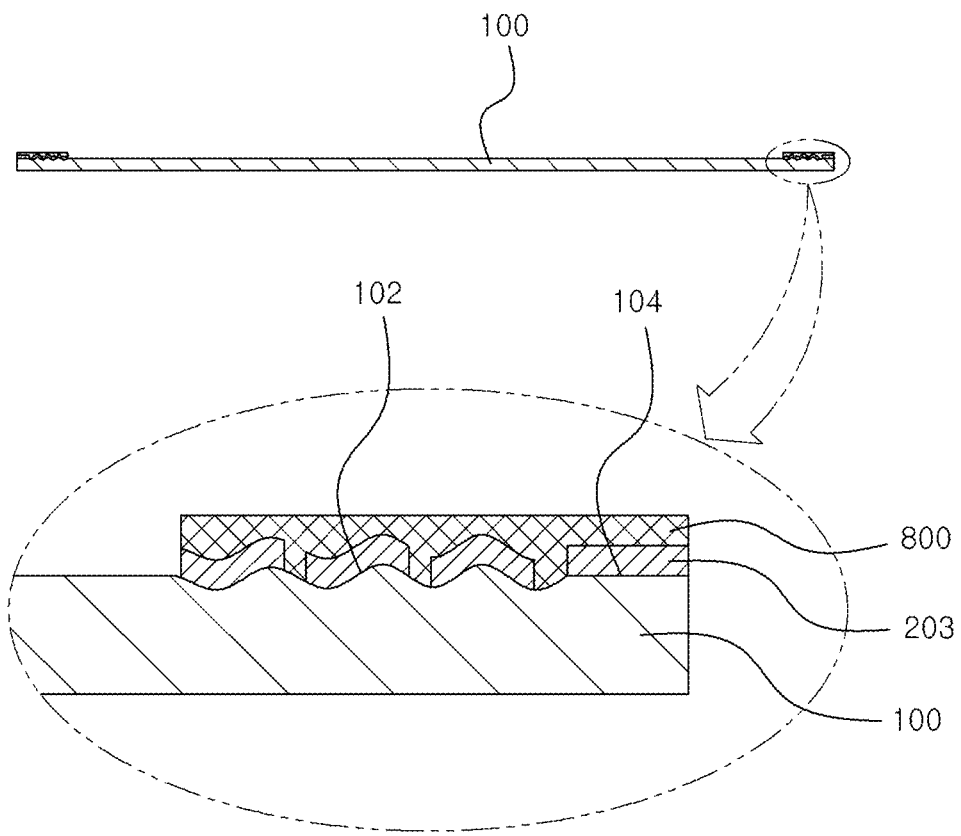
FIG. 14 is a diagram for describing a protective coating layer as the cover glass for the electronic device according to the present invention.
Figure 15:
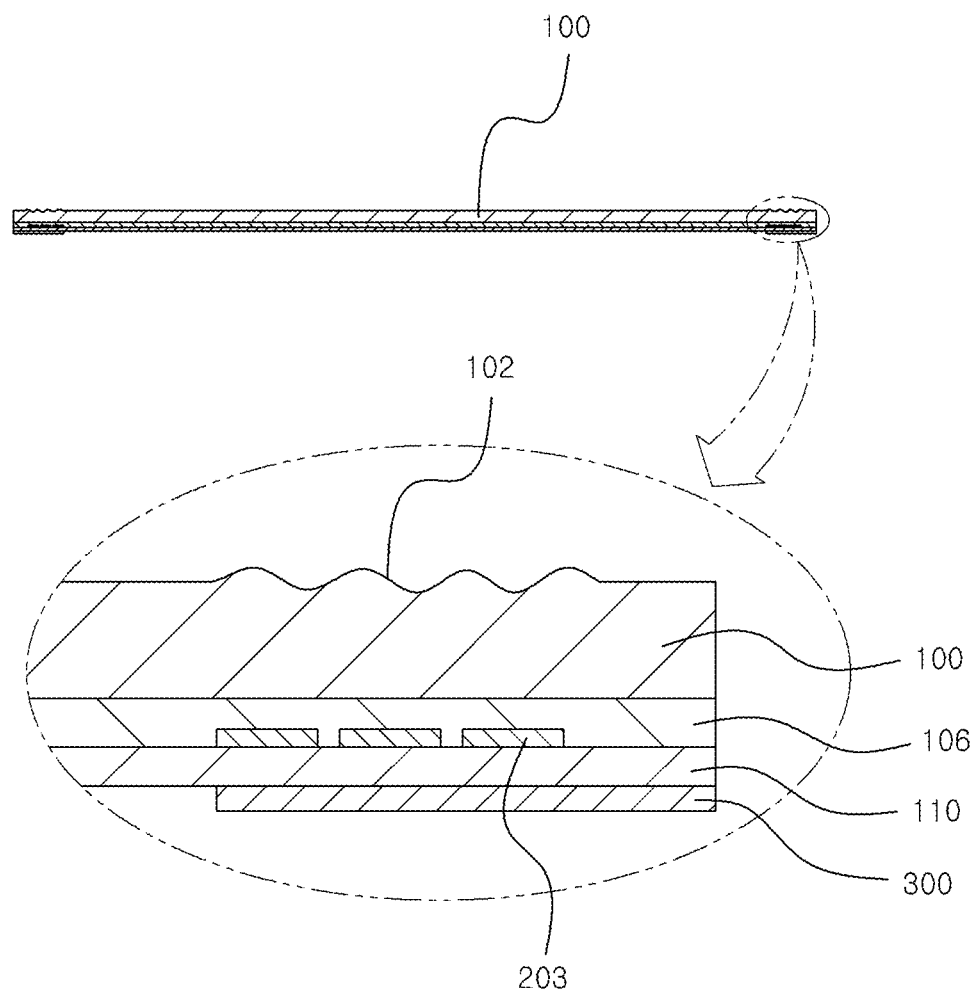
FIG. 15 is a diagram for describing a transparent film as the cover glass for the electronic device according to the present invention.

Further, FIG. 11 is a diagram for describing a metal line as the cover glass for the electronic device according to the present invention, FIG. 12 is a diagram for describing an oxide thin film layer as the cover glass for the electronic device according to the present invention, and FIG. 13 is a diagram for describing an inorganic thin film layer as the cover glass for the electronic device according to the present invention. Further, FIG. 14 is a diagram for describing a protective coating layer as the cover glass for the electronic device according to the present invention, and FIG. 15 is a diagram for describing a transparent film as the cover glass for the electronic device according to the present invention. Furthermore, the same and much the same parts as the aforementioned configurations designate the same or much the same reference numerals, and the detailed description thereof will be omitted.

Referring to FIG. 11, the cover glass for the electronic device according to the present invention may include a metal line 500 formed along the outermost edge of the glass substrate 100.

Since the metal line 500 is formed in an area which does not interfere with the signal lines, the metal line 500 needs not to be provided as the insulated structure like the metallic thin film figures 203. As an example, the metal line 500 may be formed in an area corresponding to the area with the aforementioned flat part and made of the same or similar materials as or to the aforementioned metallic thin film figures.

The metal line 500 may reflect the metallic light at the outermost edge of the glass substrate 100 to express a more advanced and unique design effect.

Referring to FIG. 12, the cover glass for the electronic device according to the present invention may include an oxide thin film layer 600 formed on the glass substrate 100, and the metallic thin film figures 203 forming the window decoration may be formed on the surface of the oxide thin film layer 600.

The oxide thin film layer 600 may express much various colors by a refractive effect of light. The oxide thin film layer 600 may be provided by coating general metal oxide such as $TiO_2$, $SiO_2$, and $Al_2O_3$ in a single-layered or laminated structure, and may be formed by general e-beam evaporation, sputtering, thermal deposition, PECVD, and the like. As an example, the oxide thin film layer may be generally coated with a thickness of about 10 to 100 nm.

Further, the printing layer 300 (for example, a black, white, or color printing layer) may be formed on the surface of the metallic thin film figures 203. In such a structure, when the thickness of the metallic thin film figures 203 is small, the printed color may be transmitted and the transmitted color is mixed with a multi-coating color of the oxide thin film layer 600 to show a final color, and thus the printed colors may be more variously formed.

Referring to FIG. 13, the cover glass for the electronic device according to the present invention may include an inorganic thin film layer 700 formed to cover the finely curved parts 102.

The inorganic thin film layer 700 may be provided to have a different refractive index from the finely curved parts 102. As the inorganic thin film layer 700, a transparent thin film such as a metallic oxide film, a metallic nitride film, and a metallic fluoride film may be used. As an example, the inorganic thin film layer may be provided by coating various types of thin films consisting of $SiO_2$ (1.46), $Al_2O_3$ (1.7), $TiO_2$ (2.45), $Ta_2O_5$ (2.2), $ZrO_2$ (2.05), $HfO_2$ (2.0), $Nb_2O_5$ (2.33), $Si_3N_4$ (2.02), $MgF_2$ (1.38), and the like in the single-layered or laminated structure by a method of sputtering, e-beam evaporation, PECVD, and the like.

The inorganic thin film layer 700 having a different refractive index from the finely curved parts 102 allows the light incident to the metallic thin film figures to be incident in much various forms to express an advanced design characteristic.

Referring to FIG. 14, the cover glass for the electronic device according to the present invention may include a protective coating layer 800 formed on one surface of the glass substrate 100 to cover the surface of the window decoration.

As an example, when the protective coating layer 800 is formed in a structure where the metallic thin film figures 203 are exposed to the outside, the protective coating layer 800 may be formed to cover the surface of the metallic thin film figures in order to protect the metallic thin film figures 203. Further, the protective coating layer 800 is formed to cover the surface of the metallic thin film figures 203 to minimize the reflection of light of the metal. In some cases, the protective coating layer and the window decoration may be disposed on opposite surface of the glass substrate, respectively.

Referring to FIG. 15, the cover glass for the electronic device according to the present invention may include a transparent film 110 laminated on the glass substrate 100, and the metallic thin film figures 203 forming the window decoration may be formed on the transparent film 110 to be provided to one surface of the glass substrate 100.

That is, in the glass substrate 100 and the transparent film 110 which are laminated to configure the cover glass, the window decoration may be formed on the transparent film 110 and the finely curved parts 102 may be formed on the remaining glass substrate 100. For reference, in the exemplary embodiment of the present invention, an example in which the finely curved parts are formed on the glass substrate and the window decoration is formed on the transparent film is described. However, in some cases, the wind decoration may be formed on the glass substrate and the finely curved parts may be formed on the transparent film.

The transparent film 110 may be adhered to the glass substrate 100 by using a general adhesive layer 106 or an adhesive film and the printing layer 300 may be formed on the lower surface of the transparent film 110. Unlike this, the window decoration and the finely curved parts are formed on the cover glass and the printing layer may be formed on the transparent film.

As described above, the present invention has been described with reference to the preferred embodiments. However, it will be appreciated by those skilled in the art that various modifications and changes of the present invention can be made without departing from the spirit and the scope of the present invention which are defined in the appended claims and their equivalents.

The invention claimed is:

1. A cover glass for an electronic device used for an electrostatic touch screen in the electronic device having the electrostatic touch screen, the cover glass comprising:
   a glass substrate provided with a plurality of undulations having contoured surfaces on a surface of the glass substrate to scatter light, the plurality of undulations comprising a first set of undulations provided between a first flat part on the surface and a second flat part on the surface and a second set of undulations provided between the second flat part and a third flat part on the surface, wherein the first flat part is coplanar with the second flat part and the third flat part and the first set of undulations and the second set of undulations are located along the same plane; and a window decoration made of a metallic material and provided on the glass substrate, wherein:
the window decoration includes a plurality of metallic thin film figures each paired with a corresponding one of the contoured surfaces of the plurality of undulations,
the plurality of metallic thin film figures are electrically insulated from each other, and
the metallic material of the metallic thin film figures is non-transparent.

2. The cover glass for an electronic device of claim 1, wherein the plurality of undulations are formed on one surface of the glass substrate and the window decoration is provided on the one surface of the glass substrate to at least partially cover the contoured surfaces of plurality of undulations, and wherein the each of the metallic thin film figures are contoured to match a contour of a corresponding one of the contoured surfaces.

3. The cover glass for an electronic device of claim 1, wherein the plurality of undulations are provided on the other surface of the glass substrate.

4. The cover glass for an electronic device of claim 1, wherein the plurality of undulations are provided on one surface of the glass substrate to cover the window decoration.

5. The cover glass for an electronic device of claim 1, wherein the plurality of metallic thin film figures are provided on the plurality of undulations and the second flat part.

6. The cover glass for an electronic device of claim 1, wherein the plurality of undulations are formed by processing the surface of the glass substrate by using at least one processing method of sandblasting, etching, plasma etching, laser processing, and mechanical processing or provided by forming a polymer resin layer having a curve on the surface of the glass substrate or a scattering layer including micro beads, and wherein the metallic thin film figures are seen directly through the glass substrate.

7. The cover glass for an electronic device of claim 1, wherein the plurality of metallic thin film figures is formed by at least one form of polygons, circles, ovals, and hairlines which are electrically insulated from each other.

8. The cover glass for an electronic device of claim 1, wherein the plurality of metallic thin film figures is formed to have any one of a width, a horizontal length, a diameter, a long axis, or a short axis which is relatively smaller than a pitch distance as a distance where signal lines of the touch screen are spaced apart from each other, and the signal lines of the touch screen are disposed on different metallic thin film figure areas which are electrically insulated from each other in the pitch distance direction, respectively.

9. The cover glass for an electronic device of claim 8, wherein the plurality of metallic thin film figures has any one of a width, a horizontal length, a diameter, a long axis, or a short axis within ½ of the pitch distance.

10. The cover glass for an electronic device of claim 1, wherein the plurality of metallic thin film figures have sizes of 0.1 μm to 0.5 mm and thicknesses of 10 to 500 nm.

11. The cover glass for an electronic device of claim 1, wherein the plurality of metallic thin film figures is provided in a single-layered or multilayered structure by using at least one of chromium, aluminum, tin, palladium, molybdenum, and copper.

12. The cover glass for an electronic device of claim 1, further comprising:
a printing layer formed on the lower surface of the window decoration.

13. The cover glass for an electronic device of claim 12, wherein the printing layer is made of an electric conductive material.

14. The cover glass for an electronic device of claim 13, wherein the printing layer has a specific resistance larger than 1 Ωcm.

15. The cover glass for an electronic device of claim 13, wherein the printing layer is connected to a ground of the electronic device.

16. The cover glass for an electronic device of claim 1, further comprising:
a metal line formed along the outermost edge of the glass substrate.

17. The cover glass for an electronic device of claim 1, further comprising:
an oxide thin film layer formed on the glass substrate, wherein the window decoration is formed on the surface of the oxide thin film layer.

18. The cover glass for an electronic device of claim 1, further comprising:
an inorganic thin film coating layer formed to cover the finely curved parts.

19. The cover glass for an electronic device of claim 1, further comprising:
a protective coating layer formed on one surface of the glass substrate to cover the window decoration.

20. The cover glass for an electronic device of claim 1, further comprising:
a transparent film laminated on the glass substrate, wherein the window decoration is formed on the transparent film to be provided on one surface of the glass substrate.

* * * * *